US012560151B2

(12) United States Patent
Harnefors et al.

(10) Patent No.: US 12,560,151 B2
(45) Date of Patent: Feb. 24, 2026

(54) GRID FREQUENCY CONTROL IN AN OFFSHORE WIND FARM

(71) Applicant: ABB Schweiz AG, Baden (CH)

(72) Inventors: Lennart Harnefors, Västerås (SE);
Ioannis Tsoumas, Zürich (CH)

(73) Assignee: ABB Schweiz AG, Baden (CH)

( * ) Notice: Subject to any disclaimer, the term of this
patent is extended or adjusted under 35
U.S.C. 154(b) by 0 days.

(21) Appl. No.: 18/876,319

(22) PCT Filed: Feb. 5, 2024

(86) PCT No.: PCT/EP2024/052758
§ 371 (c)(1),
(2) Date: Dec. 18, 2024

(87) PCT Pub. No.: WO2024/188535
PCT Pub. Date: Sep. 19, 2024

(65) Prior Publication Data
US 2026/0002515 A1 Jan. 1, 2026

(30) Foreign Application Priority Data
Mar. 10, 2023 (EP) ..................................... 23161135

(51) Int. Cl.
*H02J 3/24* (2006.01)
*F03D 7/04* (2006.01)
(Continued)

(52) U.S. Cl.
CPC .............. *F03D 7/048* (2013.01); *H02J 3/381*
(2013.01); *F05B 2270/337* (2013.01); *H02J*
*2300/28* (2020.01)

(58) Field of Classification Search
CPC .......... H02J 3/381; H02J 3/36; H02J 2300/28;
H02J 3/241
See application file for complete search history.

(56) References Cited

U.S. PATENT DOCUMENTS 7,679,208 B1 * 3/2010 Ko ......................... F03D 7/0224
290/55
7,939,970 B1 * 5/2011 Walling ................ F03D 7/0284
290/44
(Continued)

FOREIGN PATENT DOCUMENTS

CN 114303295 A 4/2022
CN 114938007 A 8/2022
(Continued)

OTHER PUBLICATIONS

EP-2884096-A1—Controlling Wind Power Plant with Negatvie
Power Capability to respond to Grid Frequency Instability (Year:
2015).*
(Continued)

*Primary Examiner* — Rexford N Barnie
*Assistant Examiner* — Terrence R Willoughby
(74) *Attorney, Agent, or Firm* — Whitmyer IP Group LLC

(57) ABSTRACT
A method of controlling a wind farm including a plurality of
wind turbines installed in an AC subgrid, which is connected
via a high-voltage rectifier and a DC line to an energy
conversion device, the method including: controlling a
power infeed of each wind turbine to maintain a setpoint grid
frequency of the subgrid; sensing a grid frequency in the
subgrid; determining a reference quantity based on a differ-
ence of the sensed grid frequency and the setpoint grid
frequency; and controlling the energy conversion device in
accordance with the determined reference quantity.

20 Claims, 2 Drawing Sheets

(51) Int. Cl.
| | | |
|---|---|---|
| *H02J 3/36* | (2006.01) | |
| *H02J 3/38* | (2006.01) | |

(56) References Cited

U.S. PATENT DOCUMENTS

| | | | | |
|---|---|---|---|---|
| 2010/0276931 A1* | 11/2010 | Wobben | ................. | F03D 9/257 |
| | | | | 290/44 |
| 2013/0128630 A1* | 5/2013 | Jensen | ..................... | H02J 3/36 |
| | | | | 363/35 |
| 2020/0400120 A1* | 12/2020 | Brogan | ................... | H02J 11/00 |
| 2023/0028868 A1* | 1/2023 | Jasim | ....................... | H02J 3/48 |

FOREIGN PATENT DOCUMENTS

| | | | | | |
|---|---|---|---|---|---|
| EP | 2884096 A1 | * | 6/2015 | ............ | F03D 7/048 |
| WO | 2015165517 A1 | | 11/2015 | | |

OTHER PUBLICATIONS

International Search Report and the Written Opinion of the International Searching Authority; Application No. PCT/EP2024/052758; Completed: Apr. 26, 2024; Mailing Date: May 24, 2024; 13 Pages.

Xie Lijun Et al; Frequency regulation participation of offshore wind farm integrated by diode-rectifer HVDC system; The Journal of Engineering; The Institution of Engineering and Technology; Michael Faraday House, Six Hills Way, Stevenage, Herts. SGI 2AY, UK; vol. 2019, No. 16; Mar. 1, 2019; 5 Pages.

Chinese First Office Action; Application No. 2024800032413; 4 Pages.

* cited by examiner

GRID FREQUENCY CONTROL IN AN OFFSHORE WIND FARM

TECHNICAL FIELD

The present disclosure is related to the field of circuit arrangements for alternating-current (AC) mains or AC distribution networks. In particular, it proposes novel methods and devices for transferring electric power between an AC subgrid via a high-voltage direct current (DC) link.

BACKGROUND

Offshore wind farms with high-voltage direct-current (HVDC) transmission to onshore is a technology that today is well established. The conventional principle is to utilize HVDC with voltage-source converters (VSCs), offshore as well as onshore. The offshore converter is operated in grid-forming mode, maintaining a nominally constant voltage magnitude and frequency of the offshore grid. With reference to the DC link from the wind farm, the onshore converter is operated in DC-bus-voltage controlling mode. This principle allows the wind turbines to operate in grid-following mode, in the same way as if they were connected to the main onshore AC grid. The HVDC transmission accepts whatever active power the wind turbines may generate at any given time; no communication between the turbines and the HVDC terminals is needed.

Recently, the desire to replace the offshore VSC HVDC terminal with a high-voltage diode rectifier has emerged, the primary drivers being cost, space and weight. The desired configuration is illustrated in FIG. 1, where the DC link and the rectifier carry reference numbers 20 and 22, respectively. However, such a scheme comes with several challenges, including the following:

The level of power transfer through a diode rectifier is determined by the voltage-magnitude difference between the AC and DC sides. Making the HVDC transmission accept the active power produced by the wind turbines requires control either of the offshore AC-bus-voltage magnitude or of the onshore DC-bus voltage.

All, or at least most, wind turbines must be operated in grid-forming mode to maintain magnitude and frequency of the offshore grid.

The two challenges are intertwined because the HVDC active-power control interplays with the offshore grid-forming control. It is challenging to find a robust design, particularly considering that there may be hundreds of wind turbines in the offshore grid.

One solution is presented in [1]. It is suggested to use the global positioning system (GPS) to provide a synchronizing signal to the wind turbines. A distributed phase-locked-loop (PLL) based frequency control is proposed in [2] as a decentralized control enabling each wind turbine to operate as a grid-forming converter without the need for communication links or a GPS signal. In [3], a variant thereof is proposed, where the active power change of each wind turbine is initiated by regulating the voltage angle of the wind-turbine converters. The voltage-angle change without proper regulation of voltage magnitude results in a frequency deviation, which is detected by all wind-turbine converters. Such deviation is then translated into a voltage magnitude change via a proportional-integral regulator in each wind-turbine converter. As a result, all wind-turbine converters change their voltage magnitude synchronously, unlike the schemes in [1] and [2].

The solution in [3] may possibly be the most promising so far proposed. Yet, it is somewhat complex, since it intermixes offshore frequency and voltage-magnitude control. In addition, a varying magnitude of the offshore grid voltage may not always be desirable, particularly if a significant swing is required between zero and maximum power transmission.

If it is deemed more attractive to instead vary the onshore DC-bus (or DC-link) voltage, then an offshore-onshore communication link is needed. The signal transmitted over the link could possibly be the sum active power produced by all wind turbines. The active power injected into the onshore AC grid by the onshore HVDC converter could then be regulated to match this signal, which would indirectly regulate the onshore DC-bus voltage. However, this solution is somewhat complex as well, since it requires communication links from all wind turbines. In addition, it does not account for the transmission losses, creating a discrepancy between the desired and actual transmitted powers.

The application published as WO2015165517A1 discloses a system where power is transferred from several wind turbines through a common AC line, fed to a DC line via a modular rectifier, and then re-converted into AC for use in an AC grid. The wind turbines receive a reference of reactive power $Q_{I,Ref}$ from a regulator so as to maintain the common AC line frequency. The selection of a reference of active power $P_{I,Ref}$ is delegated to regulators in turbine-internal control in the wind turbines.

The research paper XP006085028 (Lijun Xie et al., "Frequency regulation participation of offshore wind farm integrated by diode-rectifier HVDC system", J. Eng., vol. 2019, issue 16, pages 977-981, doi: 10.1049/joe.2018.8597) relates to large-scale wind farms, in which electric power from wind turbines connected to an AC subgrid is transferred via a diode high-voltage DC rectifier to an onshore AC system. The diode rectifier is claimed to recouple the AC subgrid and the onshore AC system in such manner that the offshore AC voltage changes with the voltage of the HVDC segment. The paper proposes configuring the wind turbines with a supplementary control mechanism—in addition to the primary frequency and inertia response control—by which the reference DC voltage $U_{dcref}$ is varied to compensate any frequency dips (relative to a reference grid frequency $f_s$) that a grid-side converter detects. According to the authors, the supplementary control mechanism lends itself to "telecommunication-less" implementations.

In the context of offshore windfarms, the problem of replacing the offshore VSC HVDC terminal with an HVDC rectifier in a commercially acceptable way thus remains unsolved.

SUMMARY

One objective of the present disclosure is to propose methods and devices suitable for controlling a plurality of wind turbines installed in an AC subgrid, which is connected via a DC line to an energy conversion device, that reduces or eliminates the need for a voltage-source converter (VSC) at the subgrid side of the DC line. It is a further objective to use, in such methods and devices, a reference quantity to which the wind farm responds as a first-order system.

At least some of these objectives are achieved by the invention as defined in the independent claims. The dependent claims relate to advantageous embodiments.

In a first aspect of the present disclosure, there is provided a method of controlling a wind farm including a plurality of wind turbines installed in an AC subgrid, which is connected via a high-voltage rectifier (22) and a DC line (or DC link) to an energy conversion device. The method comprises: controlling a power infeed of each wind turbine to maintain a setpoint grid frequency of the subgrid; sensing a grid frequency in the subgrid; determining a reference quantity based on a difference of the sensed grid frequency and the setpoint grid frequency; and controlling the energy conversion device in accordance with the determined reference quantity.

The inventors have realized that if the energy conversion device (e.g., an HVDC converter, or some type of energy storage device) is controlled based on the difference of the sensed grid frequency and the setpoint grid frequency the control of the wind farm will have advantageous dynamics. In particular, the proposed solution functions without having to supply the wind turbines with a synchronizing signal. It is understood that the regulation of the energy conversion device gives rise, through the intermediary of the DC line, to an indirect control action on the wind turbines.

In different embodiments, the energy conversion device can be controlled directly in accordance with the difference of the sensed grid frequency and the setpoint grid frequency (P regulator), or in accordance with a quantity derived from this, such as a time integral of the difference (I regulator). The reference quantity could be applied as an active power reference or an active output current reference of the energy conversion device.

In a second aspect of the present disclosure, there is provided a controller for controlling a wind farm including a plurality of wind turbines installed in an AC subgrid, which is connected via a high-voltage rectifier and a DC line to an energy conversion device. The controller is configured to: control a power infeed of each wind turbine to maintain a setpoint grid frequency of the subgrid; sense a grid frequency in the subgrid; determine a reference quantity based on a difference of the sensed grid frequency and the setpoint grid frequency; and control the energy conversion device in accordance with the determined reference quantity.

Broadly speaking, the controller according to the second aspect shares the effects and advantages of the method according to the first aspect, and it can be implemented with an equivalent degree of technical variation.

The disclosure further relates to a computer program containing instructions for causing a computer, or the controller in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which:

4

Figure 1:
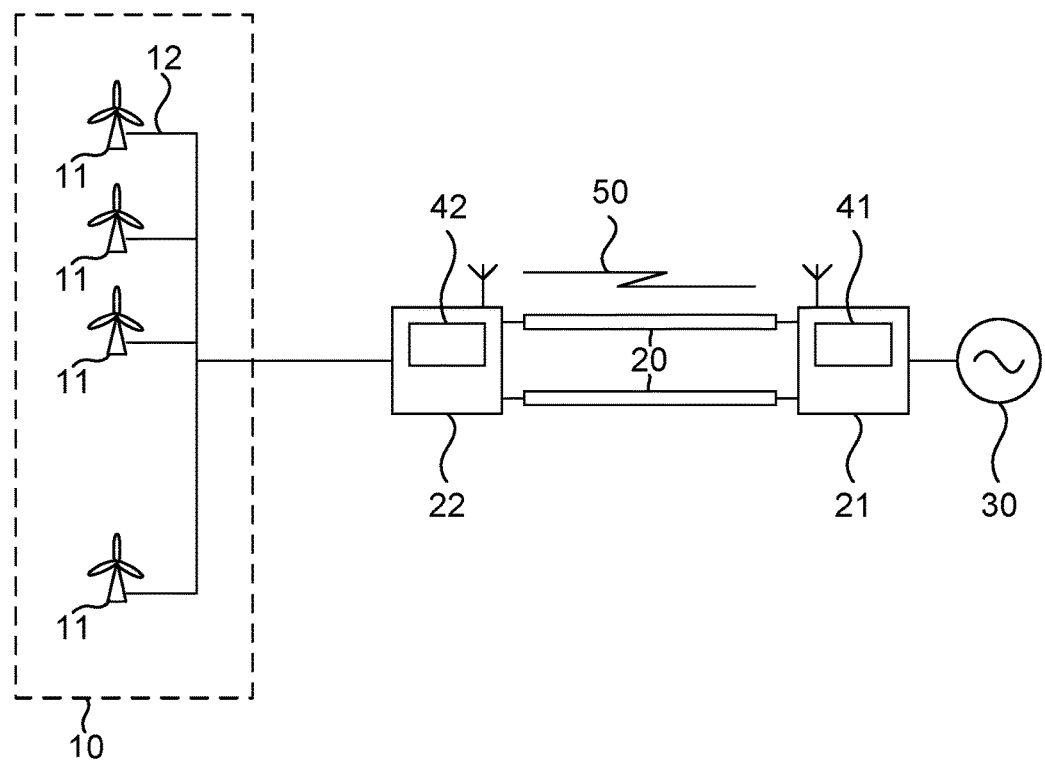
Figure 2:
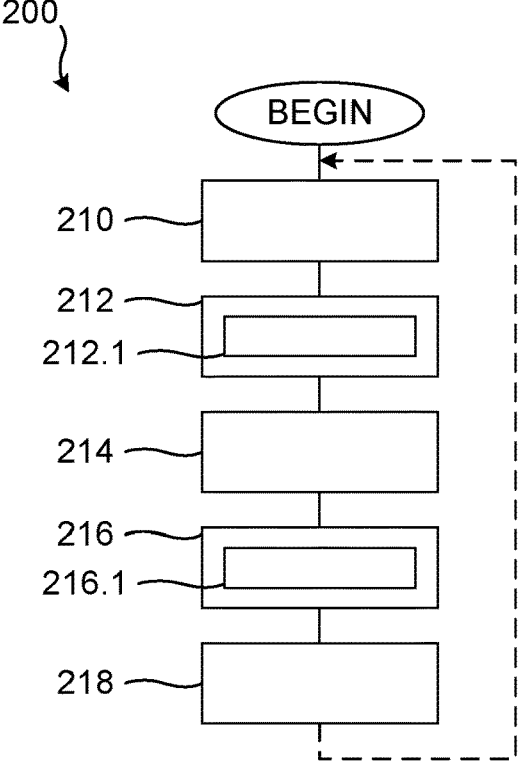
Figure 3:
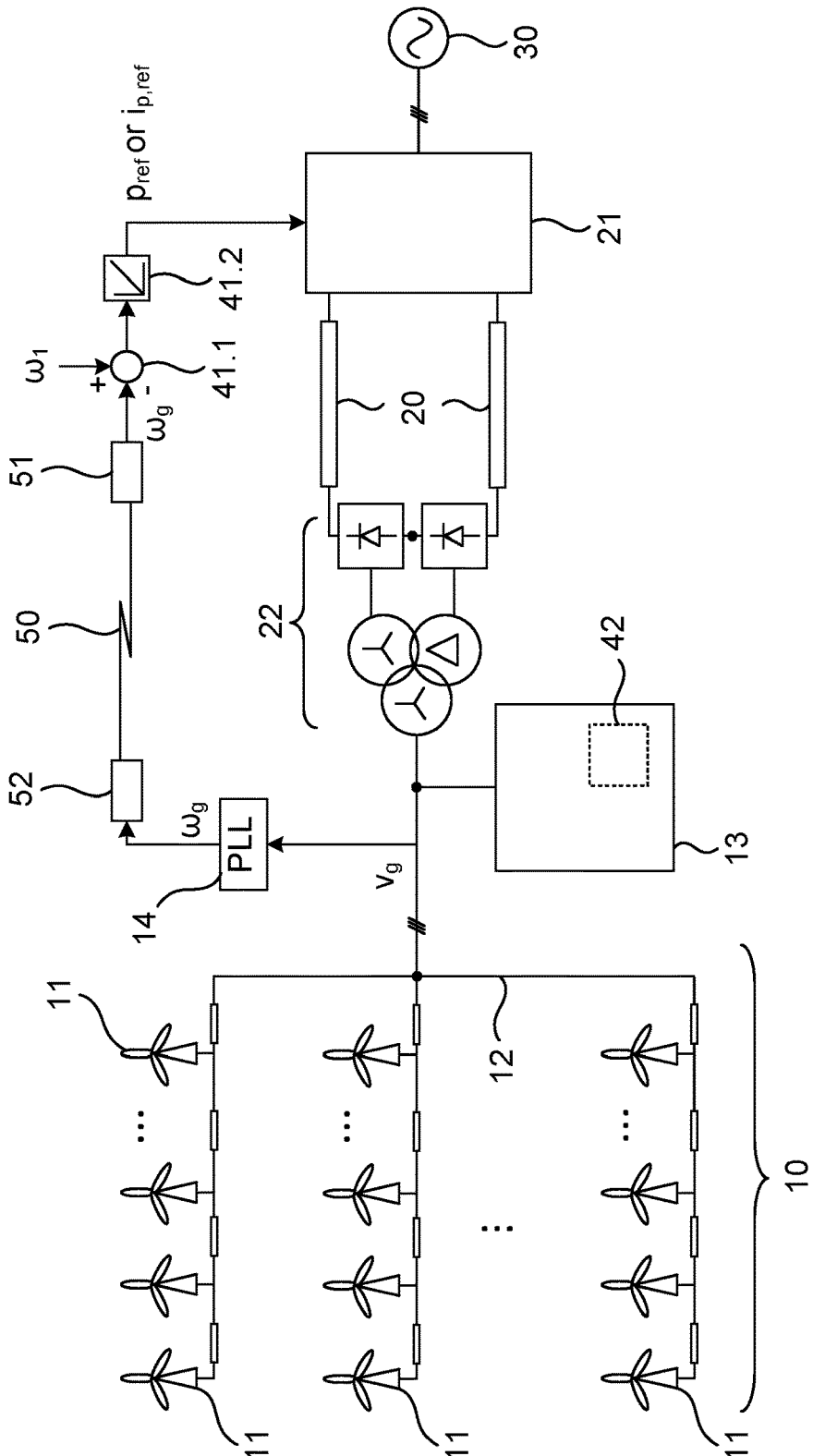

FIG. 1 is a schematic depiction of a wind farm, in which multiple wind turbines are installed in an AC subgrid, wherein electric power is transferred away from the subgrid via a DC line;

FIG. 2 is a flowchart of a method for controlling a wind farm according to embodiments herein; and FIG. 3 is a more detailed illustration of the wind farm with associated control equipment.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

FIG. 1 shows, in its left-hand part, a wind farm 10 including a plurality of wind turbines 11, which are installed in an AC subgrid 12. In the terminology of the present disclosure, a "wind farm" (or wind power station, or wind park) refers to a group of wind turbines installed on one site. Usually, the horizontal spacing of the wind turbines in a wind farm is minimal or near-minimal, in the sense that a closer spacing would imply significant energy losses due to blockage effects. The acceptable level of energy losses may be related to the applicable monetary and/or environmental cost of using the land that the wind farm occupies. In a conventional installation at the time of this disclosure, the spacing of identical wind turbines may typically be between 3 and 4 times the rotor diameter. The wind farm 10 may include tens of wind turbines 11; their total number may for example be N=50.

The present disclosure addresses in particular such wind farms where the power infeed of each wind turbine 11 is controlled by means of a droop control algorithm, in particular by means of active-power/grid-frequency droop. This is to say, the difference between a setpoint grid frequency $\omega_1$ [rad/s] and the actual grid frequency $\omega_{g,n}$ at the nth wind turbine 11 is linked to its respective output active-power reference $P_{ref,n}$ and actual output active power $P_n$ as follows:

$$\omega_1 - \omega_{g,n} = -K_p(P_{ref,n} - P_n), \qquad (1)$$

where $K_p$ is a positive control gain. The power reference $P_{ref,n}$ can be fixed or variable. A variable power reference $P_{ref,n}$ can be set by as a function of the windspeed, with a view to maintaining an equilibrium of input power and output power (and losses) in an HVDC converter; in particular, the power reference $P_{ref,n}$ may need to be set higher when the windspeed increases, or else the voltage on the DC line 20 will increase. The setpoint grid frequency may be a nominal grid frequency, such as exactly 50 Hz or another specified value. Instead of the control law (1), one may use a filter with a static gain of $K_p$; by means of the filter, a desired amount of virtual inertia and/or virtual damping can be introduced into the droop control algorithm.

One way of implementing such control is by means of power-synchronization control (PSC), as described in [4], where the control law (1) is solved for $\omega_{g,n}$ and integrated into the voltage angle at the converter terminals.

Another way of implementing (1) is by use of a so-called grid-forming phase-locked loop (PLL), as described in [5]. Because all turbines must operate in synchronism, it holds that $\omega_{g,n}=\omega_g$ in the steady state, where $\omega_g$ can be described as a global subgrid frequency. This way, the effect of a nonzero deviation in power, $P_{ref,n}-P_n\neq 0$, will be a deviation of $\omega_g$ from $\omega_1$. Specifically, an increase of $P_{ref,n}$ without a corresponding matching of $P_n$ will normally lead to an increase in $\omega_{g,n}$ and thus to an increase in the global subgrid frequency $\omega_g$.

The subgrid 12 is connected via a DC line 20 to an energy conversion device 21. As an interface between the subgrid 12 and the DC line 20, there is installed an HVDC rectifier 22. The HVDC rectifier 22 may be a passive device built using series-connected diodes. The DC line 20 may be a sea cable that connects an offshore wind farm 10 to an onshore energy conversion device 21. It could have a total length of one or more kilometers. The DC line 20 shown in FIG. 1 may as well correspond an onshore-onshore link or an offshore-offshore link.

In the example use case shown in FIG. 1, the energy conversion device 21 is an HVDC converter, which connects the DC line 20 to an AC transmission grid (or mains grid) 30. In alternative use cases, the energy conversion device 21 may be an energy storage device configured converts incoming DC energy into chemical energy in some periods and re-generates electric energy in other periods. For example, the re-generated electric energy may be fed into a transmission grid. The energy storage device may include a battery. The energy storage device may further be a power-to-hydrogen converter, including an electrolytic cell, a gas storage tank and a fuel cell for electricity generation.

As will be described in greater detail below, the energy conversion device 21 and the HVDC rectifier 22 may be provided with respective controllers 41, 42, which are operable to exchange information over a communication link 50, such as a radio link, optical link or wired data link. The wired data link may in particular include a modulated signal that is superimposed on the current flowing on the DC line 20 (power-line communication.)

The inventors are proposing a method 200 for controlling a wind farm 10 comprising the steps depicted in the flowchart of FIG. 2. It is understood that some of these steps are optional (i.e., absent from some embodiments of the method 200). Further, the steps need not be disjoint in time; rather, their execution can overlap in time.

The step 210 of controlling a power infeed of each wind turbine to maintain a setpoint grid frequency has been described above, e.g., by a droop control algorithm. It is understood that this control can continue in parallel to the execution of the further steps of the method 200. This is suggested graphically by the loop in FIG. 2.

In a step 212, a grid frequency $\omega_g$ in the subgrid is sensed. The grid frequency $\omega_g$ may be measured by a PLL. The sensing or measuring may be performed. For example, the sensing or measuring may take place in the vicinity of the HVDC rectifier 22, e.g., at a point in the subgrid that is separated by a low or negligible impedance from the HVDC rectifier 22.

In a next step 214, a reference quantity based on a difference of the sensed grid frequency and the setpoint grid frequency $\omega_1$ is determined. The reference quantity may be an active output power reference $p_{ref}$ or an active output power-producing current reference $i_{p,ref}$ of the onshore HVDC converter 21. A pure integrator can be used, which can be expressed as:

$$p_{ref} = -K_i \int (\omega_1 - \omega_g)dt \qquad (2a)$$

or, in terms of operator corresponding to the Laplace transform variable s=d/dt, as $$p_{ref} = -\frac{K_i}{s}(\omega_1 - \omega_g). \qquad (2b)$$

In some embodiments of the control method 200, the reference quantity further includes a term proportional to the difference of the sensed grid frequencies (P regulator) and/or a time derivative of the difference of the sensed grid frequencies (D regulator). This can be used to fine-tune the behavior of the control loop. Instead of using a constant setpoint frequency $\omega_1$ in (2a)-(2b), such as the nominal grid frequency, it is possible to apply a reference frequency that transiently deviates from the nominal grid frequency. This enables, in the active powers from the wind turbines 11, a transient response to frequency variations in the main grid (a so-called frequency response) and to similar perturbations.

The energy conversion device 21 is controlled, in a step 216, in accordance with the reference quantity. Also step 216 can last for the remaining duration of the method 200.

Now, if $\omega_g$ increases due to an increase of one or more of the $P_{ref,n}$ values (step 218), then $p_{ref}$ starts to increase as well. Summing over N wind turbines yields:

$$(\omega_1 - \omega_g)N = -K_p(P_{ref} - P) \Leftrightarrow \omega_1 - \omega_g = -\frac{K_p}{N}(P_{ref} - P), \qquad (3)$$

where $P=\Sigma_n P_n$ is the total active power from the wind farm and $P_{ref}=\Sigma_n P_{ref,n}$ its reference. Neglecting any communication time delay, influence of dynamics (e.g., inertia, rotating masses and other energy storage in the running system) and energy dissipation, so that an instantaneous power balance $P=p_{ref}$ will establish, and substituting (3) into (2b), one obtains:

$$P = \frac{K_i K_p}{sN}(P_{ref} - P) \Leftrightarrow P = \frac{1}{sT+1}P_{ref}.$$

In other words, P in the controlled system is expected to respond to $P_{ref}$ as a first-order system with a time constant of $T=N/K_i K_p$.

In one group of embodiments, the described method 200 is implemented in a first controller 41 arranged in the vicinity of the energy conversion device 21 (e.g., the first controller 41 has a communication link to the energy conversion device 21 with acceptable reliability and capacity, preferably a wired communication link). In particular, the first controller 41 may be arranged at the energy conversion device 21 or may be an integral component thereof. In this case, the sensing of the grid frequency in the subgrid (step 212) comprises a substep 212.1 of communicating the sensed grid frequency to the first controller 41. Alternatively, a quantity derived from the sensed grid frequency, such as the difference $\omega_1-\omega_g$ or a time integral thereof, is communicated to the first controller 41. For this purpose, the communication link 50 may be utilized.

FIG. 3 relates to such embodiments where the method 200 is implemented in the first controller in the vicinity of the energy conversion device 21. In detail, a PLL 14 is arranged to estimate the subgrid frequency $\omega_g$ from a time evolution of a grid voltage vg. The subgrid frequency $\omega_g$ is forwarded over a communication link 50, which is in this example maintained by two wireless interfaces 51, 52. A subtractor component 41.1 of the first controller computes the difference $\omega_1 - \omega_g$ and feeds it to an integral controller 41.2. The output of the integral controller 41.2—this is the reference quantity $p_{ref}$ or $i_{p,ref}$—is used as one control signal to the energy conversion device 21.

FIG. 3 further illustrates in some detail an example structure of the HVDC converter, which converts a three-phase AC voltage into a DC voltage by means of an YYD connection and two diodes. The unit 13 in FIG. 3 represents harmonic filters and/or a reactive compensation unit. As suggested, the unit 13 is an optional placement for the second controller 42 (see next paragraph) if no first controller 41 is provided.

In another group of embodiments, the method 200 is implemented in a second controller 42, which is arranged in the vicinity of the wind farm 10, e.g., where it is convenient to sense the subgrid frequency $\omega_g$. In particular, the second controller 42 may be installed at or in the HVDC rectifier 22 or at the unit 13. In this group of embodiments, the controlling of the energy conversion device 21 (step 216) comprises a substep 216.1 of communicating the determined reference quantity to the energy conversion device 21. Substep 216.1 may be executed by means of a communication link 50 as illustrated in FIG. 1.

Furthermore, the method 200 can be implemented in a distributed manner, e.g., with functionality in both the first and the second controllers 41, 42, and optionally with the support of networked ('cloud') processing resources.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling a wind farm including a plurality of wind turbines installed in an AC subgrid, which is connected via a high-voltage rectifier and a DC line to an energy conversion device, the method comprising:

controlling a power infeed of each wind turbine to maintain a setpoint grid frequency ($\omega_1$) of the subgrid;

sensing a grid frequency ($\omega_g$) in the subgrid;

determining a reference quantity based on a difference of the sensed grid frequency and the setpoint grid frequency; and controlling the energy conversion device in accordance with the determined reference quantity.

2. The method of claim 1, wherein the reference quantity includes a time integral of the difference of the sensed grid frequencies.

3. The method of claim 1, wherein the reference quantity further includes a term proportional to the difference of the sensed grid frequencies and/or a time derivative of the difference of the sensed grid frequencies.

4. The method of claim 1, wherein the reference quantity is an active output power reference or an active output current reference of the energy conversion device.

5. The method of claim 1, wherein the energy conversion device is a high-voltage DC converter which connects the DC line to an AC transmission grid.

6. The method of claim 1, wherein the energy conversion device is an energy storage device, such as a power-to-hydrogen converter or a battery.

7. The method of claim 1, wherein the power infeed of each wind turbine is controlled by means of a droop control algorithm, in particular by means of active-power/grid-frequency droop.

8. The method of claim 1, wherein the power infeed of each wind turbine is controlled in accordance with a variable active-power reference.

9. The method of claim 1, wherein the grid frequency in the subgrid is sensed in the vicinity of the high-voltage DC rectifier, which is arranged at the subgrid side of the DC line.

10. The method of claim 1, which is implemented in a first controller arranged in the vicinity of the energy conversion device, wherein sensing the grid frequency in the subgrid comprises communicating the sensed grid frequency, or a quantity derived therefrom, to the first controller.

11. The method of claim 1, which is implemented in a second controller (42) arranged in the vicinity of the wind farm, wherein controlling the energy conversion device comprises communicating the determined reference quantity to the energy conversion device.

12. The method of claim 10, wherein said communicating step is performed using a radio link, optical link or wired data link.

13. The method of claim 1, wherein the subgrid is an offshore grid.

14. A controller for controlling a wind farm including a plurality of wind turbines installed in an AC subgrid, which is connected via a high-voltage rectifier and a DC line to an energy conversion device, the controller configured to:

control a power infeed of each wind turbine to maintain a setpoint grid frequency ($\omega_1$) of the subgrid;

sense a grid frequency ($\omega_g$) in the subgrid;

determine a reference quantity based on a difference of the sensed grid frequency and the setpoint grid frequency; and control the energy conversion device in accordance with the determined reference quantity.

15. A computer program comprising instructions to cause a controller to execute a method, the controller for controlling a wind farm including a plurality of wind turbines installed in an AC subgrid, which is connected via a high-voltage rectifier and a DC line to an energy conversion device, the controller configured to:

control a power infeed of each wind turbine to maintain a setpoint grid frequency ($\omega_1$) of the subgrid;

sense a grid frequency ($\omega_g$) in the subgrid;

determine a reference quantity based on a difference of the sensed grid frequency and the setpoint grid frequency; and control the energy conversion device in accordance with the determined reference quantity, the method including:

controlling a power infeed of each wind turbine to maintain a setpoint grid frequency ($\omega_1$) of the subgrid;

sensing a grid frequency ($\omega_g$) in the subgrid;

determining a reference quantity based on a difference of the sensed grid frequency and the setpoint grid frequency; and controlling the energy conversion device in accordance with the determined reference quantity.

16. The method of claim 2, wherein the reference quantity is an active output power reference or an active output current reference of the energy conversion device.

17. The method of claim 2, wherein the reference quantity is an active output power reference or an active output current reference of the energy conversion device.

18. The method of claim 2, wherein the energy conversion device is a high-voltage DC converter which connects the DC line to an AC transmission grid.

19. The method of claim 2, wherein the energy conversion device is an energy storage device, such as a power-to-hydrogen converter or a battery.

20. The method of claim 2, wherein the power infeed of each wind turbine is controlled by means of a droop control algorithm, in particular by means of active-power/grid-frequency droop.

\* \* \* \* \*